(12) United States Patent
Woodworth et al.

(10) Patent No.: US 7,940,653 B2
(45) Date of Patent: May 10, 2011

(54) AUDIOVISUAL DATA TRANSPORT PROTOCOL

(75) Inventors: Brian R. Woodworth, Irving, TX (US); Enrique Ruiz-Velasco, Flower Mound, TX (US)

(73) Assignees: Verizon Data Services LLC, Temple Terrace, FL (US); Telesector Resources Group, Inc., New York, NY (US)

( * ) Notice: Subject to any disclaimer, the term of this patent is extended or adjusted under 35 U.S.C. 154(b) by 488 days.

(21) Appl. No.: 11/590,866

(22) Filed: Nov. 1, 2006
(Under 37 CFR 1.47)

(65) Prior Publication Data
US 2008/0055399 A1 Mar. 6, 2008

Related U.S. Application Data

(63) Continuation-in-part of application No. 11/467,977, filed on Aug. 29, 2006, now Pat. No. 7,817,557.

(51) Int. Cl.
*H04J 1/16* (2006.01)
(52) U.S. Cl. ......... 370/229; 370/230; 370/232; 370/235
(58) Field of Classification Search .................. 370/229, 370/230, 230.1, 231, 232, 235, 236; 725/32, 725/34–36, 116, 118, 146, 148
See application file for complete search history.

(56) References Cited

U.S. PATENT DOCUMENTS

| | | | | |
|---|---|---|---|---|
| 5,689,800 | A * | 11/1997 | Downs | 725/114 |
| 5,819,004 | A * | 10/1998 | Azadegan et al. | 386/112 |
| 6,008,847 | A * | 12/1999 | Bauchspies | 375/240.01 |
| 6,097,757 | A | 8/2000 | Boice et al. | |
| 6,212,206 | B1 | 4/2001 | Ketcham | |
| 6,249,324 | B1 | 6/2001 | Sato et al. | |
| 6,310,857 | B1 * | 10/2001 | Duffield et al. | 370/232 |
| 6,377,931 | B1 | 4/2002 | Shlomot | |
| 2001/0047517 | A1 | 11/2001 | Christopoulos et al. | |
| 2002/0024999 | A1 * | 2/2002 | Yamaguchi et al. | 375/240.03 |
| 2003/0099298 | A1 | 5/2003 | Rose et al. | |
| 2003/0208609 | A1 | 11/2003 | Brusca | |
| 2004/0010585 | A1 * | 1/2004 | Jones et al. | 709/224 |
| 2004/0049793 | A1 * | 3/2004 | Chou | 725/87 |
| 2004/0139088 | A1 * | 7/2004 | Mandato et al. | 707/100 |
| 2005/0122393 | A1 | 6/2005 | Cockerton | |
| 2005/0155072 | A1 * | 7/2005 | Kaczowka et al. | 725/95 |
| 2005/0157660 | A1 * | 7/2005 | Mandato et al. | 370/254 |

OTHER PUBLICATIONS

Wikipedia. Ranking. Sep. 25, 2009. <http://en.wikipedia.org/wiki/Ranking>.*

* cited by examiner

*Primary Examiner* — Brian D Nguyen
*Assistant Examiner* — Ashil Farahmand

(57) ABSTRACT

The present invention discloses systems and methods for transmitting video messages between network terminals over a network. When transmitting video data, a first network determines at least one video parameter based on, at least, the performance of the first network terminal, the performance of the network performance and user-preference data. Transmitted video data is encoded based on the video parameter.

23 Claims, 4 Drawing Sheets

AUDIOVISUAL DATA TRANSPORT PROTOCOL

BACKGROUND INFORMATION

To transmit audio and video data over a computer network, the data is typically processed prior to transmission to maximize quality and minimize consumption of system resources. Issues of quality and resource consumption are of greater concern when audio and video are transmitted together in a network communication system (e.g., video conferencing, video telephony). Such "real-time" communication systems must maintain a constant stream of data between participants. As such, the demand for a device's resources may limit the audio and/or video quality provided by the system. Communication devices must, therefore, balance overall audio and video quality against several factors including: system performance, consumption of resources, and user preferences.

Two factors determining the overall quality of audio/video communications include latency and quality. In a communication system, latency is the delay measured from the time data is recorded at a source device, to the time the data is presented at a destination device. Within overall latency, network latency is the time required for data to traverse the network from the source to the destination. In addition, system latency arises from the time required for the source device to record, process, and transmit the audio/video data and, likewise, the time required for the destination device to receive, process and present the data.

Latency is particularly problematic in real-time communications systems because video and audio must be presented with as little delay as possible to enable natural interaction between participants. Excessive latency causes, among other things, cross-talk and echo that may severely impair the participants' ability to communicate effectively.

Latency is an even greater concern in packet-switched networks, such as the Internet. In a packet-switched network, data sent from a source device is divided into a plurality of packets that travel individually through the network to a destination device. Each packet, however, may arrive at the destination in a different sequence than the packets were originally sent. This difference may arise from a variety of factors, including: capacity of various routes, network congestion, re-routing, bottlenecks, and protocol incompatibilities. Additional latency is therefore introduced due to the time required for the destination terminal to re-sequence the data packets and reform the original data message. Even more problematic is that this latency may vary widely depending on the resources available in the devices and conditions present in the system at any particular time.

With regard to quality, audio and video data quality in a network communication system depends on several factors. Video quality is related to, for example, the video's resolution, frame rate, color quality, frame size (i.e., the number of pixels in a frame), and method of data compression. When the quality of audio and/or video is increased, the additional processing required consumes greater resources and, in turn, increases the overall latency in the communication system. For instance, if the level of audio/video quality exceeds a device's capacity to process the data, the encoded quality of audio and video may suffer due to loss of unprocessed data.

Quality is further affected by fluctuations in the audio/video presentation, commonly referred to as "jitter." In a packet-switched network, jitter may result from data packets being delayed in transmission over the network, such that a complete audio/video message cannot be assembled before presentation to the user. As a result, segments of the audio and video may not be presented and, instead, cause audio and/or video to jitter, thereby detracting from the participants' natural communication.

To compensate for jitter, a reserve pool of data may be stored in a data buffer to provide a steady supply of data, while other data is processed. If the buffer is too small to compensate for delay in the system (e.g., due to slow processing), the reserve of packets stored in the buffer may become depleted and result in jitter as, for example, the data buffer intermittently fills and depletes. On the other hand, if buffer size is increased to provide sufficient reserve to avoid jitter, the increased buffering introduces additional latency, thereby detracting from overall quality of communication.

Thus, as discussed above, the quality of an audio and video signal can be increased in a network communication system. But an increase in quality may be offset by an undesirable increase in latency. Accordingly, a network communication system must balance latency with audio and video quality to provide highest overall quality for a given set of conditions.

DETAILED DESCRIPTION OF PREFERRED EMBODIMENTS

The following description refers to the accompanying drawings in which the same numbers in different drawings represent similar elements unless otherwise represented. The preferred embodiments set forth in the following description do not represent all possible embodiments consistent with the claimed invention. Instead, they are merely examples of systems and methods consistent with certain aspects related to the invention.

Preferred methods and systems described herein allow for improved communication of audio and video between two or more terminal locations of a network. In the one embodiment, a first network terminal (e.g., source terminal) provides, at least, audio and video data to a second network terminal (e.g., destination terminal). The source terminal monitors the performance of the terminal hardware, the network and/or user preferences and, based on these factors, dynamically modifies video transport parameters to ensure that high-quality video is presented at the destination terminal in accordance with user-preferences. Through intelligent buffering of audio and network data, low latency transfer of audio data is achieved while tolerating fluctuations in network jitter without distorting audio output. The network transport mechanism allows for dynamic readjustments to compensate for changes in the network that are outside the user's control.

Figure 1:
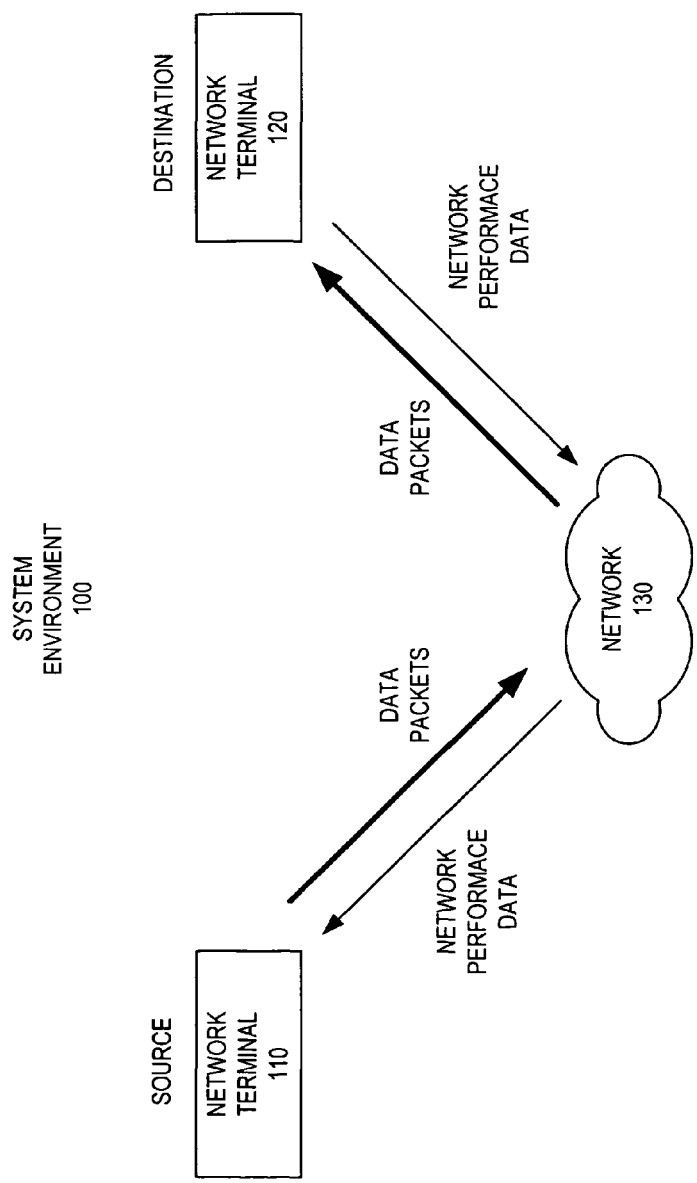
FIG. 1 illustrates a block diagram of an exemplary system environment consistent with certain aspects related to the present invention.

FIG. 1 is a block diagram showing a system environment 100 which may be used in implementing the preferred embodiments described herein. System environment 100 may include, at least, first network terminal 110, second network terminal 120, and network 130.

Network terminals 110 and 120 may include components consistent with computing systems such as processors, memory and input/output devices that enable a user to provide audio and video to a network communication system. Network terminals 110 and 120 may be implemented using one or more generic computer systems including, for example, personal computer, minicomputer, microprocessor, workstation, server or similar computer platforms. Alternatively, network terminals 110 and 120 may encompass or be embedded within a specialized computing system including, for example, a set-top box, video telephone, video game console, a portable telephone, personal digital assistant, or portable game device. Network terminals 110 and 120 may be located in a user's home, at a business, in a public kiosk or in a portable device. Furthermore, network terminals 110 and 120 may be a owned by a user or may be provided to the user by a communications service provider, for example, in conjunction with television broadcast service, telephone service, broadband data (e.g., Internet) service, or other communication services.

Network 130 may be one or more communication networks that communicate data between network terminals 110 and 12Q. Network 130 may be any type of network for communicating data, including text, pictures, voice and video. In some instances, network 130 may possess sufficient bandwidth to transmit real-time audio or video between network terminals 110 and 120. Network 130 may be a shared, public, private, or peer-to-peer network encompassing a wide or local area including an extranet, an Intranet, the Internet, a Local Area Network (LAN), Wide Area Network (WAN), public switched telephone network (PSTN), Integrated Services Digital Network (ISDN), radio links, cable television network, satellite television network, terrestrial wireless network, and any other form of wired or wireless communication networks.

Network 130 may be compatible with any type of communications protocol used by the components of the system environment to exchange information, such as Ethernet, ATM, Transmission Control/Internet Protocol (TCP/IP), Hypertext Transfer Protocol (HTTP), Hypertext Transfer Protocol Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), high bandwidth wireless protocols (e.g., EV-DO, WCDMA) or peer-to-peer protocols. The providers of network 130 may be, for instance, an Internet Service Provider (ISP), a landline telephone carrier, a cell phone system provider, a cable television provider, a satellite television provider, an operator of a WAN, an operator of LAN, or an operator of point-to-point network.

FIG. 1 further illustrates the flow of data in system environment 100. Data may be transmitted from source terminal 110 over network 130 to destination terminal 120. Data may be encoded in packets comprising a set of computer-readable data bits including, among other information, a portion of a data message that, when properly assembled in combination, forms a complete data message. A packet may contain message data representing, for instance, video information, audio information, text, graphics or the like. In a real-time communication system, for example, the message may include digital video data comprising a portion of a conversation that is presented to a user at the destination network terminal 120.

FIG. 1 illustrates a system environment 100 that includes two, network terminals 110 and 120, and network 130. As is readily apparent, other embodiments may include a plurality of network terminals or other network-enabled devices linked over multiple networks by a plurality of network exchange points sharing data between the networks. Furthermore, for the purposes of explanation, FIG. 1 illustrates data flowing only from source terminal 110 to destination terminal 120. Regardless, it to be understood that both terminals 110 and 120 may send and receive at least audio and video data.

Figure 2:
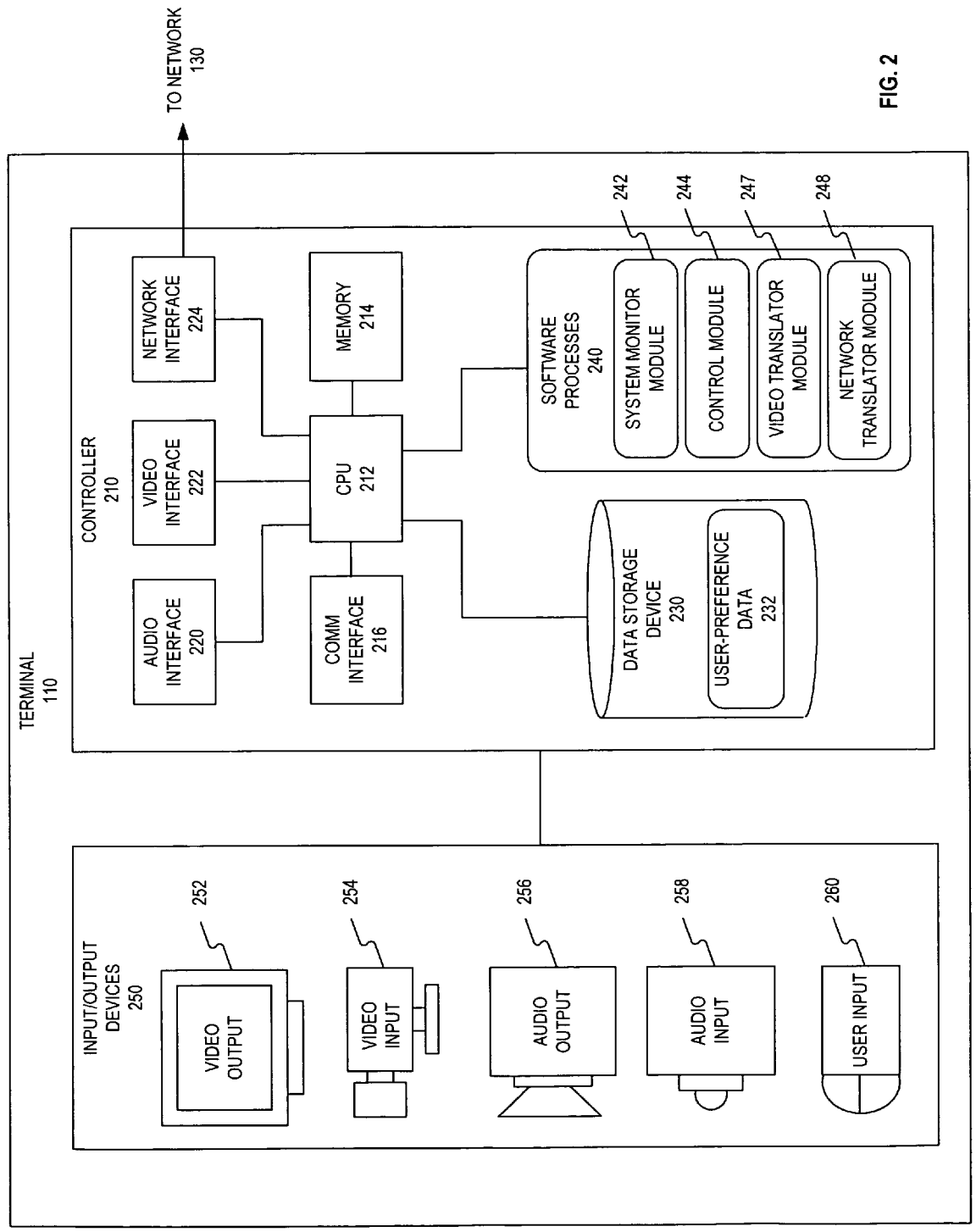
FIG. 2 illustrates a block diagram of an exemplary network terminal consistent with certain aspects related to the present invention.

FIG. 2 provides a block diagram showing aspects of an exemplary network terminal 110 including components for receiving, displaying, processing and transmitting audio and video data, communicating over network 130, and certain other components. Network terminal 110 may include controller 210 and input/output devices 250. Controller 210 may be one or more processing devices that execute computer instructions stored in one or more memory devices to provide functions and features such as described herein. Controller 210 may include, for example, central processing unit (CPU) 212, memory 214, communication interface 216, audio interface 220, video interface 220, and network interface 224.

CPU 212 provides control and processing functions for network terminal 110 by processing instructions and data stored in memory 214. CPU 212 may be any conventional controller such as off-the-shelf microprocessor (e.g., INTEL PENTIUM), or an application-specific integrated circuit specifically adapted for network terminal 110. CPU 212 may also include, for example, coprocessors, memory, registers and/or other processing devices as appropriate.

Memory 214 may be one or more memory devices that store data, operating system and application instructions that, when executed by CPU 212, perform the processes described herein. Memory 214 may include semiconductor and magnetic memories such as random access memory (RAM), read-only memory (ROM), electronically erasable programmable ROM (EEPROM), flash memory, optical disks, magnetic disks, etc. When user terminal 110 executes an application installed in data storage device 230, CPU 212 may load at least a portion of instructions from data storage device 230 into memory 214.

Communications interface 216 provides one or more interfaces for transmitting and/or receiving data into CPU 212 from external devices, including any of input/output devices 250. Communications interface 226 may be, for example, a serial port (e.g., RS-232, RS-422, universal serial bus (USB), IEEE-1394), parallel port (e.g., IEEE 1284), or wireless port (e.g., infrared, ultraviolet, or radio-frequency transceiver). In some embodiments, audio, video and/or network data may be exchanged with CPU 212 through communications interface 216.

Audio interface 220 may be any device for enabling audio data exchange between CPU 212 and audio devices 256 and/or 258. Audio interface 220 may perform functions such as buffering, filtering, biasing, and other conditioning of signals exchanged between controller 210 and audio input 258. In addition, audio interface 220 may include an analog-to-digital converter for encoding analog audio signals produced by audio input device 258 into digital data. Similarly, audio interface 220 may include a digital-to-analog converter for converting digital audio data into analog audio signals for audio output device 256.

Video interface 222 may be any device for enabling video data exchange between CPU 212 and video devices 252 and/or 254. Video interface 222 may perform functions such as filtering, biasing, and other conditioning of signals exchanged between video input 254 and controller 210. In addition, video interface 222 may include an analog-to-digital converter for converting analog video signals produced by video input device 254 into digital data. Similarly, video interface 222 may include a digital-to-analog converter for converting digital video data from CPU 212 into analog video signals for video output device 252.

Network interface 224 may be any device for sending and receiving data, between CPU 212 and network 130. Network interface 224 may, in addition, modulate and/or demodulate data messages into signals for transmission over network 130 data channels (over cables or wirelessly). Further, network interface 224 may support any telecommunications or data network including; for example, Ethernet, WiFi, token ring, ATM, or ISDN. Alternatively, network interface 224 may be an external network interface connected to CPU 212 though communications interface 216.

Data storage device 230 includes computer-readable instructions and data for network terminal 110 to provide and/or receive audio and/or video data over network 130. Data storage device 230 may include software such as program code for network communications, operating system, kernel, device drivers, configuration information (e.g., Dynamic Host Configuration Protocol configuration), a web browser, and any other software that may be installed on network terminal 110. For example, data storage device 230 may store a user interface that may be accessible using input/output devices 250 and allow a user of terminal 110 to access the functionality provided therein. Where the terminal 110 is implemented as a set-top box, the user interface may include such features as a program guide, channel selector, pay-per-view or video-on-demand selector, and an interface to control the various video recording and playback control options. In the preferred embodiments, such a user interface includes an access to the network communication facilities described herein, thus allowing a user of user terminal 110 to select the network communication facility using, for example, the user input devices 260.

Input/output devices 250 include, for example, video output 252, video input 254, audio output 256, audio input 258 and user input 260. Video output 252 may be any device for displaying visual information such as a cathode ray tube (CRT), liquid crystal display (LCD), light emitting diode display (LED), plasma display, or electroluminescent display. Video input device 254 may be an analog or digital camera, camcorder, or other image-capture device. Audio output device 256 may be a speaker, headphone, earpiece, or other audio transducer that converts electrical signals into audible tones. Audio input 258 device may be a microphone or other audio transducer that converts audible sounds into electrical signals and may be a stand-alone device or incorporated in other devices such as a telephone handset. User input device 260 may be any conventional device for communicating user's commands to network terminal 110 including, for example, keyboard, keypad, computer mouse, touch screen, trackball, scroll wheel, joystick, television remote controller, or voice recognition controller. Signals from input/output devices may also be exchanged with CPU 212 through communications interface 224.

As further illustrated in FIG. 2, source terminal 110 may execute software processes 240 associated with providing audio and video data to destination terminal 120, as further described below. In addition to an operating system and/or software applications known in the art, CPU 212 may execute a system monitor module 242, control module 244, video translator module 247 and network translator module 248.

System monitor module 242 may execute instructions and potentially also data for monitoring the system performance of source terminal 110 and, in particular, controller 210. System performance may be measured from various components associated with controller 210 including, CPU 212, memory 214, and network interface 224. Measurements may be provided by system monitor module 242 and provided to control module 244 as a one or more values representing performance (e.g., metrics). Performance metrics may be provided individually to control module 244 or, one or more of such metrics may be combined into a single metric representing a combined measure of system performance. System monitor module 242 may measure CPU 212 usage based on, for example, the number of active software processes 240, the number of process objects being processed by CPU 212 and/or the percentage available processing capacity remaining in CPU 212. System monitor module 242 may measure memory 214 usage based on, for example, the availability of one or more of physical memory, kernel memory or virtual memory. Further, with respect to each, memory usage may measure different aspects of memory usage including total memory available and/or peak memory usage. Finally, system monitor module may measure network 130 usage based on available network interface 224 capacity, such as percentage of maximum throughput. Other measures of terminal's 110 performance may be measured as well, as is well known.

Control module 244 may be computer-executable instructions that, when executed by controller 210, is responsible for controlling, maintaining, and performing calculations to determine parameters for controlling at least video translator module 247 and network translator module 248. Control module 244 may also exchange data with other software processes 240 including system performance data from system monitor module 242 and network performance data from network translator module 248. Further, control module 244 may access user-preference data 232 stored, for example, in data storage device 230.

Video translator module 247 may be computer-executable instructions that, when executed by controller 210, translates video data exchanged between video interface 222 and CPU 212. Video translator module 247 may include a compression-decompression software ("CODEC") that selectively encodes and/or decodes video data to/from one or more of several format including, for example, MPEG, INDEO, CINEPAK or VIDEO1. In addition, video translator module 247 may receive video encoding parameters from control module 244 for controlling source terminal's 110 consumption of system and network resources.

Network translator module 248 may be computer-executable instructions and potentially also data that, when executed by controller 210, translates data sent and received from network 130. Network translator module 248 may exchange data with at least control module 244, video translator module 247, and network interface 224. When sending video to destination terminal 120, network translator module 248 may receive video data and translate the data into a format for transmission over network 130 by network interface 224 in accordance a network data protocol (such as those mentioned previously). For instance, network translator module 248 may translate compressed video data into packets according to the TCP/IP protocol for transmission over a packet switched network such as the Internet. Conversely, when receiving video data from network 130, network translator module 248 may receive data from network interface 224 and translate the data into video data that is passed, respectively, to video translator module 247 for decoding and presentation by input/output devices 250. In addition, network translator module 248 may receive video encoding parameters from control module 244 for controlling source terminal's 110 consumption of system and network resources.

The configuration or relationship of the hardware components and software modules illustrated in FIG. 2 is exemplary. The components of network terminal 110 may be independent components operatively connected, or they may be integrated into one or more components including the functions of some or all of components 210-260. For example, input/output devices 250 may be a plurality of independent devices within separate housings detachably connected to a generic controller, such as a personal computer or home entertainment system. In other implementations, controller 210 and input/output devices 250 may be integrated within a single housing such as a portable telephone. Different configurations of components may be selected based on the requirements of a particular implementation of a network terminal giving consideration to factors including, but not limited to, cost, size, speed, form factor, capacity, portability, power consumption and reliability, as is well known. Moreover, terminals useful in implementing the preferred embodiments may have greater or fewer components than illustrated in FIG. 2. Network terminal 110 may include functionality directed towards other capabilities. For example, network terminal 110 may be a set-top box providing broadcast video. In such a case, the network terminal 110 may include components such as a radio-frequency (RF) interface to receive and transmit broadcast signals. The RF interface may be further connected to other known components for tuning and processing RF modulated audio/video signals, which may also be connected to audio interface 220 and/or video interface 222. Likewise, if user terminal 110 is a mobile telephone, then terminal 110 may include other components such as an RF interface to receive and transmit wireless communications signals, which may be further connected to other known components to process such wireless communications signals, and which may be further connected to network interface 224 to provide connectivity to network 130.

Although network terminal 120 is not detailed in FIG. 2, terminal 120 may include the same or similar components and functionality as that described above for network terminal 110 and illustrated in FIG. 2. As well, FIG. 2 depicts software modules for execution by CPU 212 and such modules may be implemental in hardware, and/or a combination of hardware and software, adopted for use with CPU 212 or a different CPU based on the particular configuration.

Figure 3:
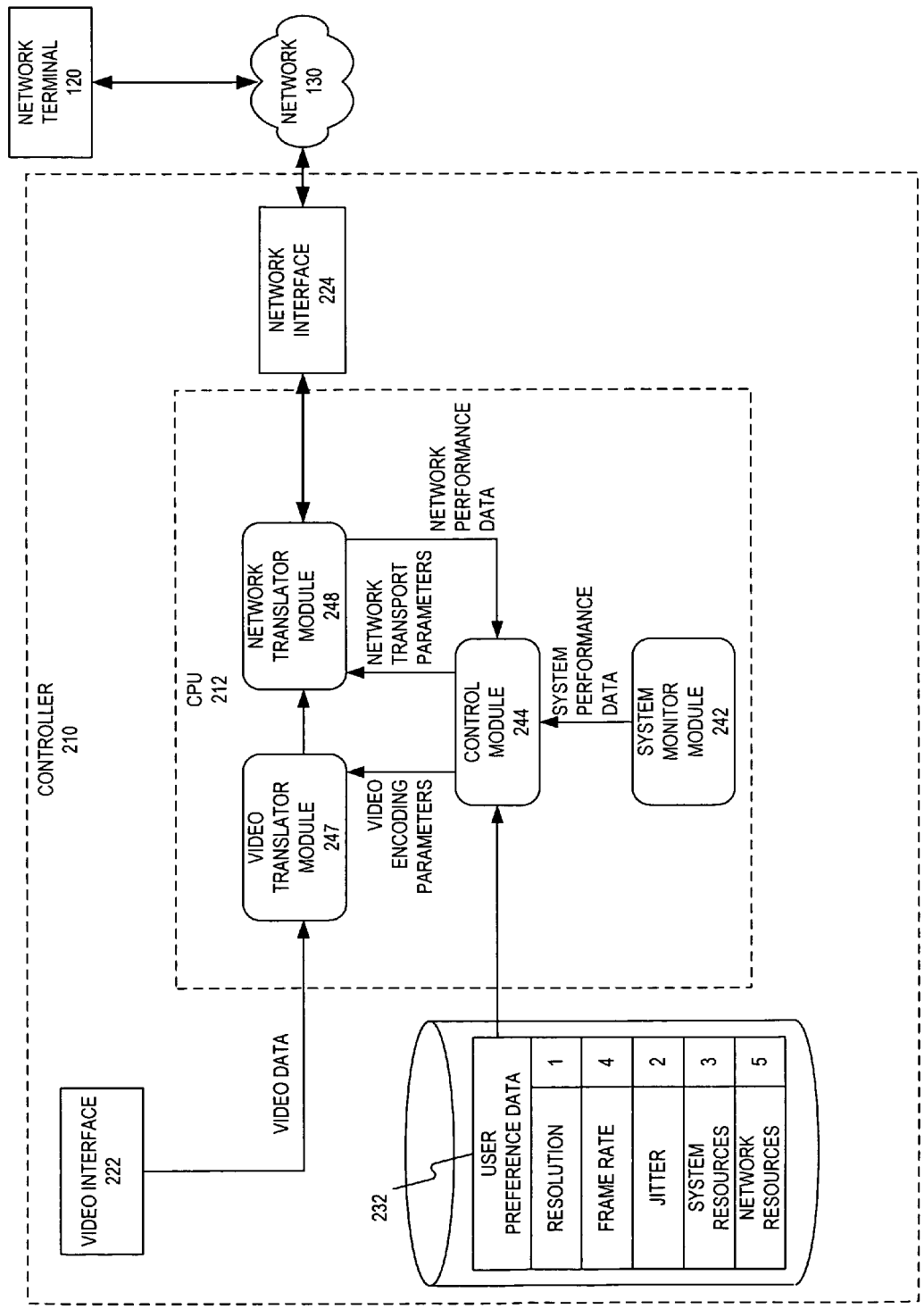
FIG. 3 illustrates a functional diagram of an exemplary network terminal consistent with certain aspects of data related to the present invention.

With reference to FIG. 3, the functional block diagram illustrates the processing of video data by source terminal 110 for transmission over network 130 to destination terminal 120. In this exemplary embodiment, video translator module 247 receives video data recorded by video input device 254 and passed to video interface 222 where it may be buffered, signal conditioned and/or converted to a digital data stream. Video translator module 247 may perform compression and/or other signal processing of the video data, and subsequently pass the processed video data to network translator module 248 for transmission over network 130 to destination terminal 120. As will be explained in more detail below, the video data output by video translator module 247 is changed based on video encoding parameters determined by control module 244.

Network translator module 248 may exchange data received from network 130 by network interface 224 and provide the data to, at least, control module 244 and video translator module 247. For instance, video data may be provided by network translator module 248 for translation into data packets for transmission over a packet switched network. In some embodiments, network translator module 248 may package the video data in accordance with the RTP (real-time transport protocol) for real-time streaming of the video data over the Internet. Further, network translator module 248 may perform additional processing of the video data, such as adding timestamps, synchronizing and/or encrypting the data. As will be explained in more detail below, the video data output by network translator module 248 may be changed based on network transport parameters determined by control module 244.

In addition, network translator module 248 may receive video data from network interface 224. In accordance with one disclosed embodiment, data may include, at least, video data sent by network terminal 120. As above, the video data may be received in packets encoded using the RTP. Network translator module 248 may, for example, de-packetize the received data and forward the video to video translator module 247 for decompression and presentation by video output devices 252.

Furthermore, network translator module 248 may receive network performance data describing network's 130 performance. Network 130 performance data may include, among other information, a count of packets sent, number of packets lost, percentage of packets lost, delay between packets, an estimation of jitter and/or video delay. For example, network performance may be provided by destination network terminal 120 within a control packet in accordance with the RTP. Network translator module 248 may subsequently provide the network performance data to other software modules, including control module 244 for use in determining video transport parameters.

Data storage device may store user-preference data 232 for access by, at least, control module 244 for determining video transport parameters. In particular, user-preference data 232 may store a user's preferences regarding various parameters related to video quality including, for example, resolution, frame rate, color quality, frame size, system resource consumption and/or network resource consumption. Each parameter may be associated with data indicating a user's priority for that parameter with respect to the other parameters. For instance, as shown in FIG. 3, the user-preference data 232 may include a user's ranking of each parameter. For example, a user participating in a video conference may assign the greatest priority to jitter parameter, and then, in decreasing order of rank, resolution, frame size, frame rate, system resource consumption, and network resource consumption. Alternatively, a user may assign greatest priority to system resource parameter to ensure that video quality is not compromised by processing time consumed by the other processes being executed by CPU 212. Other ranking orders and parameters may be used. In the absence of user-provided preferences, user-preference data 232 may include default preferences. Further, the system may store different sets of default preferences for different types of communication (e.g., video conferencing, video telephony, one-way video streaming, video gaming, etc.) or different types of network terminals (e.g., personal computer, set-top box, video telephone, cellular telephone, etc.).

Based on user preference data 232 from data storage device 230, system performance data from system monitor module 242 and network performance data from network translator module 248, control module 244 may determine video transport parameters including video encoding parameters for video translator module 247 and/or network transport parameters for network translator module 248. Video transport parameters may be modified dynamically, in real-time (or near real-time) during communication between network terminals 110 and 120 in response to changes in system performance data, network performance data and/or user-preference data 232. In modifying transport parameters, control module 244 will balance network and system performance resources to allow transport of video data in accordance with user-preferences.

Figure 4:
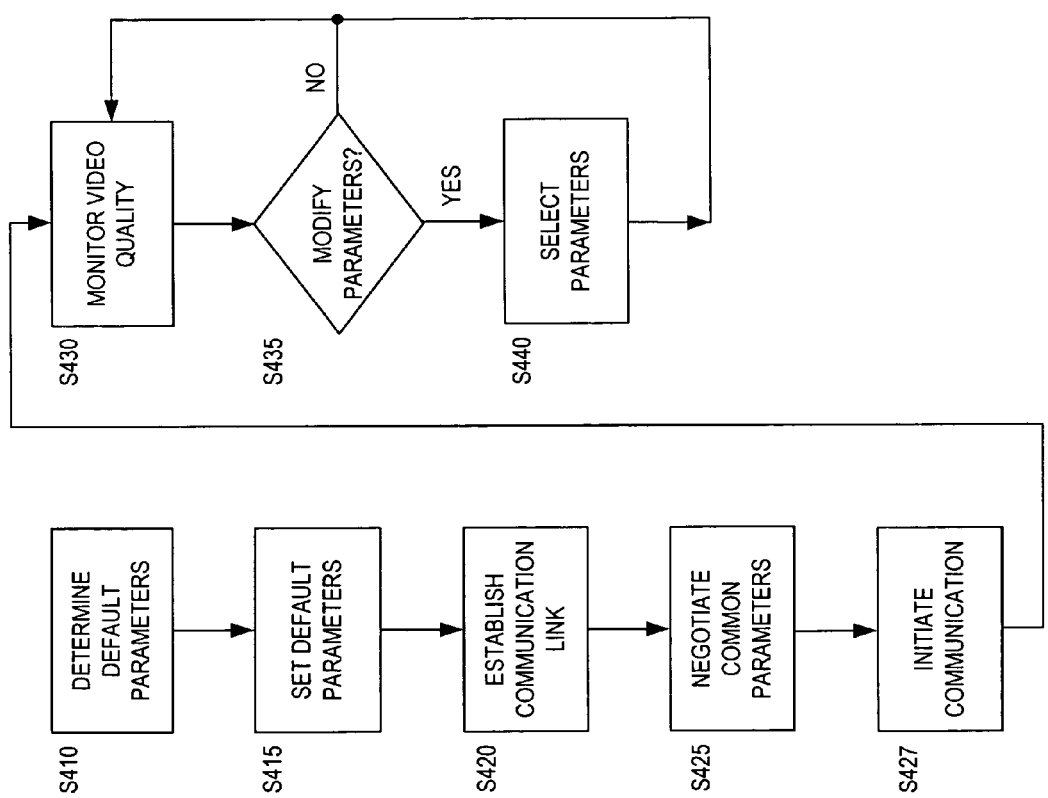
FIG. 4 illustrates a flowchart exemplifying aspects related to the present invention.

With reference to FIG. 4, the flow chart illustrates an exemplary process for controlling the transport of video communicated between terminals 110 and 120. Initially, control module 244 determines default parameters for video translator module 247 and network translator module 248. (S410) Because, different types of communications may support different initial configurations, the default parameters may change depending on the relationship between terminals 110 and 120. For instance, a long-distance video conference between five participants may require different default parameters then a local video-telephone call between two participants. Accordingly, control module 244 may select an appropriate set of default parameter values based on a given set of circumstances. For instance, default parameters may be based on one or more of number of participants, distance between participants, network terminal type, network terminal video quality, network terminal audio quality, network type, network transmission rate and network transmission protocol. Default values for the different initial configurations may be stored in data storage device 230 (for example, as part of the user-preference data 232) and referenced by control module 244 based on, for example, a look-up table or, alternatively, may be determined from an algorithm.

After determining default parameters, control module 244 may command video translator module 247 to set the default parameters for encoding and decoding video data. (S415) Video parameters may include: frame size: (e.g., 80×60-1600×1200), frames per second (1-50), color quality (e.g., 1 bit-24 bit), and compression method: (e.g., none, MPEG-4, MPEG-2, WMV). Video parameters may also control video data buffering (e.g., buffer size, buffer rate and/or buffer delay). Likewise, controller module 244 may command network translator module 248 default parameters for transmitting and/or receiving video data. In particular, network transport parameters may control, for example, bandwidth, transmission rate, transmission interval, number of data streams and/or encryption.

Control module 244 may next cause source terminal 110 to establish communication link with destination terminal 120 (S420). Once communication is established, terminals 110 and 120 may negotiate a common set of video transport parameters. (S425) In particular, terminals 110 and 120 may determine baseline parameters for use during initial communication between the terminals, as well as minimum and maximum thresholds defining a range over which video transport parameters may vary around the baseline parameters during communication. The negotiated parameters may be based on each of terminals' 110 and 120 current processing capacity, network performance and/or user-preferences.

Communication between terminals 110 and 120 may be initiated after the negotiation of parameters has been completed by control module 244. (S427) First, control module 244 informs video translator module 247 and network translator module 248 of the negotiated parameters. Next, as communication commences video translator module 247 may begin receiving video data from video interface 222, process the video using the negotiated parameters, and feed network translator module 248 with video data for transmission over network 130.

While communication between 110 and 120 is in progress, controller module 244 monitors the video data for quality. (S430) Performance data is received by controller module 244 from at least system monitor module 242 and network translator module 248. As discussed previously, system monitor module 242 may provide one or more metrics representing system performance including performance of CPU 212, memory 214 and/or network interface 224. Additionally, network performance data received from destination terminal 120, for example, may include information regarding packets lost, packet delay, jitter, and video quality. Based on this performance data, control module 244 may estimate current video quality. (S435) Control module 244 then determines, based on the estimate of current video quality, whether the parameters may be modified. (S435) In making this determination, control module weighs the user-preference data 232 against current system and network performance to provide encoding parameters that balance each resulting in the highest video quality for the given data. Rather than an algorithm, the determination may be made based on one or more look-up tables relating performance metrics with stored sets of video transport parameters. Factors used in the estimation may include: (i) whether quality deteriorated or is it about to deteriorate beyond a defined threshold, (ii) whether the deterioration occurred for a defined amount of time; and/or (iii) whether changes to parameters would be within the ranges defined by user-preferences and/or negotiated with destination terminal 120.

If control module 244 determines that current video quality warrants the modification of video transport parameters, control module 244 may select video encoding parameters to provide the best-quality video for the current state of network terminal 110 and network 130. (S440) Otherwise, the current video transport parameters are retained by control module 244. For instance, control module 244 may execute an algorithm that selects video parameters based on predetermined relationship between the user-preferences parameters and, at least, system performance data and network performance data. Alternatively, video transport parameters may be determined using one or more predefined look-up tables correlating parameter values with, one or more of user preferences, system performance data and network performance data. In either case, control module 244 may adjust video encoding parameters based on a hierarchy associated with user-preference data 232.

CONCLUSION

Components and/or features of embodiments described herein may be implemented in various configurations. For purposes of explanation only, certain preferred embodiments of the present invention are described herein with reference to the components illustrated in FIGS. 1-4. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Embodiments described herein may be implemented in various environments. Such environments and related applications may be specifically constructed for performing the various processes and operations described herein, or they may include a general purpose computer or computing platform selectively activated or configured by program instructions to provide the described functionality. The processes disclosed herein are not inherently related to any particular computer or other apparatus, and may be implemented by a suitable combination of hardware, software, and/or firmware. For example, various general purpose data processing machines may be used with programs written to implement portions of the preferred embodiments described herein; or it may be more effective, convenient and/or cost-effective to construct a specialized apparatus or system to perform the described methods or techniques.

Embodiments described herein may be further implemented in processor-readable media that include program instructions and/or data configured to perform the various methods described herein. The program instructions may be those specially designed and constructed, or they may be of the kind well-known and available to artisans in the field of computer software. Examples of program instructions include, for example, machine code such as produced by a compiler, files containing high-level code executable by a computer via an interpreter, or levels of abstraction therebetween.

Embodiments also within the scope of the present invention include computer readable media having executable instructions or data fields stored thereon. For brevity, computer readable media having computer executable instructions may sometimes be referred to as "software" or "computer software." Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. Executable instructions exemplarily comprise instructions and in and some instances data that cause a general purpose computer, special purpose computer, or special purpose processing device to perform a certain function or group of functions.

The preferred embodiments have been described in the general context of computer-executable instructions, such as program modules, being executed by a "computer." Generally, program modules include routines, programs, objects, components, data structures, etc. that perform particular tasks or implement particular abstract data types. Moreover, those skilled in the art will appreciate that the invention may be practiced with other computing system configurations other than a computer, including hand-held devices, multiprocessor systems, microprocessor-based or programmable consumer electronics, network PCs, minicomputers, computer clusters mainframe computers, and the like. Since the invention may be practiced in distributed computing environments, tasks may also be performed by remote processing devices that are linked through a communications network. In a distributed computing environment, program modules may be located in both local and remote memory storage devices.

Further, the sequence of events described in FIG. 4 is exemplary and not intended to be limiting. Thus, other method steps may be used, and even with the method depicted in FIG. 4, the particular order of events may vary without departing from the scope of the present invention. Moreover, certain steps may not be present and additional steps may be implemented in FIG. 4. Also, the processes described herein are not inherently related to any particular apparatus and may be implemented by any suitable combination of components.

The foregoing description of preferred embodiments consistent with the present invention does not represent a comprehensive list of all possible embodiments or all variations of the embodiments described. The description of only some embodiments should not be construed as an intent to exclude other embodiments or variations thereof. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A method, comprising:
    storing user-preference data indicating a user's video quality preferences, the user-preference data comprising:
        a first video quality parameter having a first ranking by the user and specifying a first video quality characteristic; and
        a second video quality parameter having a second ranking by the user relative to the first ranking and specifying a second video quality characteristic which is different from the first video quality characteristic;
    storing data representing the performance of the first network terminal;
    storing data representing the performance of the network;
    the network communicatively coupled to the first network terminal and a second network terminal;
    determining at least one video transport parameter based on at least the first network terminal performance data, the network performance data, and the rankings of the first and second video quality parameters;
    encoding the video data based on the determined at least one video transport parameter; and
    transmitting the encoded video data over the network from the first network terminal to the second network terminal.

2. The method of claim 1, wherein determining the at least one video transport parameter includes:
    estimating the quality of the video data presented at the second network terminal based on at least one of the first network terminal performance data and the network performance data; and
    modifying the at least one video transport parameter if the estimate does not meet a predetermined threshold,
    wherein the video data is encoded based on the modified at least one video transport parameter.

3. The method of claim 2, wherein modifying the at least one video transport parameter includes selecting the at least one video transport parameter based on the rankings of the first and second video quality parameters.

4. The method of claim 2, wherein the first and second video quality parameters include at least one of the following characteristics: video resolution, frame rate, jitter, color quality, frame size, or compression format.

5. The method of claim 1, wherein first network terminal performance data represents at least one of: processor usage, memory usage, or network usage.

6. The method of claim 1, wherein network performance data represents at least one of: data lost, data delay, jitter, or video quality.

7. The method of claim 1, wherein the at least one video transport parameter controls at least one of: video resolution, video frame rate, video frame size, video color quality, or video buffer size.

8. The method of claim 1, wherein the at least one video transport parameter controls at least one of: data transmission bandwidth, data transmission rate, data transmission interval, number of data streams, or data encryption.

9. The method of claim 1, wherein determining the at least one video transport parameter includes negotiating the at least one video transport parameter between the first network terminal and the second network terminal.

10. The method of claim 9, wherein the video data is not encoded based on the at least one video transport parameter if the video transport parameter is outside a range negotiated by the first network terminal and the second network terminal prior to transmitting.

11. The method of claim 9, wherein the video data is not encoded based on the at least one video transport parameter if the video transport parameter is outside a range specified by the user-preference data.

12. A system, comprising:
a network communicatively coupled to a plurality of network terminals including a first network terminal and a second network terminal,
wherein the first network terminal is configured to:
store user-preference data indicating a user's video quality preferences, the user-preference data comprising:
a first video quality parameter having a first ranking by the user and specifying a first video quality characteristic;
a second video quality parameter having a second ranking by the user relative to the first ranking and specifying a second video quality characteristic which is different from the first video quality characteristic;
store data representing the performance of the first network terminal;
storing data representing the performance of the network;
determine at least one video transport parameter based on at least the first network terminal performance data, the network performance data, and the rankings of the first and second video quality parameters;
encode the video data based on the determined at least one video transport parameter; and
transmit the encoded video data over the network from the first network terminal to the second network terminal.

13. The system of claim 12, wherein the first network terminal is further configured to determine the at least one video transport parameter by:
estimating the quality of the video data presented at the second network terminal based on at least one of the first network terminal performance data and the network performance data; and
modifying the at least one video transport parameter if the estimate does not meet a predetermined threshold associated with the first video quality parameter or the second video quality parameter,
wherein the first network terminal is further configured to encode the video data based on the modified at least one video transport parameter.

14. The system of claim 13, wherein the first network terminal is further configured to modify the at least one video transport parameter by selecting the at least one video transport parameter based on the rankings of the first video quality parameter and the second video quality parameter.

15. The system of claim 13, wherein the first and second video quality parameters include at least one of the following characteristics: video resolution, frame rate, jitter, color quality, frame size, or compression format.

16. The system of claim 12, wherein first network terminal performance data represents at least one of: processor usage, memory usage, or network usage.

17. The system of claim 12, wherein network performance data represents at least one of: data lost, data delay, jitter, or video quality.

18. The system of claim 12, wherein the at least one video transport parameter controls at least one of: video resolution, video frame rate, video frame size, video color quality, or video buffer size.

19. The system of claim 12, wherein the at least one video transport parameter controls at least one of: data transmission bandwidth, data transmission rate, data transmission interval, number of data streams, or data encryption.

20. The system of claim 12, wherein determining the at least one video transport parameter includes negotiating the at least one video transport parameter between the first network terminal and the second network terminal.

21. The system of claim 20, wherein the video data is not encoded based on the at least one video transport parameter if the video transport parameter is outside a range negotiated by the first network terminal and the second network terminal prior to transmitting.

22. The system of claim 20, wherein the video data is not encoded based on the at least one video transport parameter if the video transport parameter is outside a range specified by the user-preference data.

23. A terminal device comprising:
a memory storing processor-executable instructions;
a processor coupled to the memory and configured to execute the processor-executable instructions;
a network interface coupled to the processor and configured to communicate over a network;
wherein the processor-executable instructions are configured to cause the processor to:
store user-preference data indicating a user's video quality preferences, the user-preference data comprising:
a first video quality parameter having a first ranking by the user and specifying a first video quality characteristic;
a second video quality parameter having a second ranking by the user relative to the first ranking and specifying a second video quality characteristic which is different from the first video quality characteristic;
store data representing the performance of the terminal device;
store data representing the performance of the network;
determine at least one video transport parameter based on at least the terminal device performance data, the network performance data, and the rankings of the first and second video quality parameters;
encode the video data based on the determined at least one video transport parameter; and
transmit the encoded video data over the network from the terminal device to a destination network terminal.

* * * * *